United States Patent
Young et al.

(10) Patent No.: US 10,165,429 B1
(45) Date of Patent: Dec. 25, 2018

(54) SYSTEMS AND METHODS FOR FACILITATING VEHICLE INCIDENT COMMUNICATIONS

(71) Applicant: UIPCO, LLC, San Antonio, TX (US)

(72) Inventors: Stephen Young, San Antonio, TX (US); Jon-Michael Kowall, San Antonio, TX (US); Michael Kyne, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 15/045,811

(22) Filed: Feb. 17, 2016

Related U.S. Application Data

(60) Provisional application No. 62/267,647, filed on Dec. 15, 2015.

(51) Int. Cl.
*H04W 4/90* (2018.01)
*B60Q 9/00* (2006.01)
*B60W 50/08* (2012.01)
*G08B 25/01* (2006.01)

(52) U.S. Cl.
CPC ............... *H04W 4/90* (2018.02); *B60Q 9/00* (2013.01); *B60W 50/08* (2013.01); *G08B 25/016* (2013.01)

(58) Field of Classification Search
None
See application file for complete search history.

(56) References Cited

U.S. PATENT DOCUMENTS

| | | | | |
|---|---|---|---|---|
| 2008/0242261 A1* | 10/2008 | Shimanuki | ............. | G08B 17/00 455/404.2 |
| 2010/0279647 A1* | 11/2010 | Jacobs | ................... | H04W 4/22 455/404.1 |
| 2015/0187146 A1* | 7/2015 | Chen | ..................... | G07C 5/008 701/31.5 |
| 2016/0323718 A1* | 11/2016 | Dawson | ................ | G06Q 50/18 |

* cited by examiner

*Primary Examiner* — Leon-Viet Nguyen
(74) *Attorney, Agent, or Firm* — Baker & Hostetler LLP

(57) ABSTRACT

This disclosure relates to facilitating vehicle incident communications. In one use case, a mobile device may detect a vehicular accident and determine one or more contacts to notify about the vehicular accident. An occupant of the vehicle may be prompted, via a user interface of the mobile device, to confirm or cancel a proposed communication to the contact(s). Upon confirmation of the proposed confirmation, the communication to the contact(s) may be transmitted.

20 Claims, 7 Drawing Sheets

SYSTEMS AND METHODS FOR FACILITATING VEHICLE INCIDENT COMMUNICATIONS

CROSS REFERENCE TO RELATED APPLICATIONS

This application claims priority to U.S. Provisional Application No. 62/267,647, filed Dec. 15, 2015, entitled "Systems and Methods for Facilitating Vehicle Incident Communications" and is incorporated by reference herein in its entirety.

BACKGROUND OF THE INVENTION

Despite the many innovations and improvements to vehicle safety—anti-lock brakes, crumple zones, and collision avoidance systems, to name a few—vehicle accidents remain an all too common occurrence. And incident to those accidents is the need for assistance, including medical assistance. Thus, it remains important to minimize the time between a vehicle accident and the appropriate parties being made aware of the accident.

Accordingly, there remains an unmet need to (further) minimize the time between a vehicle accident and the appropriate parties being made aware of the accident.

SUMMARY OF THE INVENTION

Described herein are one or more embodiments for facilitating vehicle incident communications. In an aspect, a method for providing a communication about a vehicular accident via a mobile device may include accessing, by the mobile device, data indicative of a possible vehicular accident involving a vehicle. Data indicative of an aspect of an occupant of the vehicle may be accessed by the mobile device. Based at least on the data indicative of the possible vehicular accident, the mobile device may determine that the vehicular accident occurred. Based at least on the data indicative of the aspect of the occupant, the mobile device may determine a contact to notify about the vehicular accident. The mobile device may electronically transmit the communication to the contact.

In another aspect, computer-readable memory may have stored thereon executable instructions that when executed by a processor of a mobile device cause the processor to effectuate operations for providing a communication about a vehicular accident. The operations may include accessing, by the mobile device, data indicative of a possible vehicular accident involving a vehicle. The operations may further include accessing data indicative of an aspect of an occupant of the vehicle and determining, based at least on the data indicative of the possible vehicular accident, that the vehicular accident occurred. The operations may also include determining, based at least on the data indicative of the aspect of the occupant, a contact to notify about the vehicular accident and electronically transmitting the communication to the contact.

In yet another aspect, a method for providing a communication about a vehicular accident via a communicatively connected first mobile device and second mobile device may include accessing, by the first mobile device, first data indicative of a possible vehicular accident involving a vehicle and accessing, by the second mobile device, second data indicative of a possible vehicular accident involving the vehicle. The first mobile device may access first data indicative of an aspect of a first occupant of the vehicle. The second mobile device may access second data indicative of an aspect of a second occupant of the vehicle. Based at least on the first data indicative of the possible vehicular accident and the second data indicative of the possible vehicular accident, it may be determined that the vehicular accident occurred. A contact to notify about the vehicular accident may be determined based at least on at least one of the first data indicative of the aspect of the first occupant or second data indicative of the aspect of the second occupant. The communication may be electronically transmitted to the contact.

BRIEF DESCRIPTION OF THE DRAWINGS

So that those having ordinary skill in the art, to which the present invention pertains, will more readily understand how to employ the novel system and methods of the present invention, certain illustrated embodiments thereof will be described in detail herein-below with reference to the drawings, wherein.

A component or a feature that is common to more than one drawing is indicated with the same reference number in each of the drawings.

DETAILED DESCRIPTION OF CERTAIN EMBODIMENTS

Figure 1:
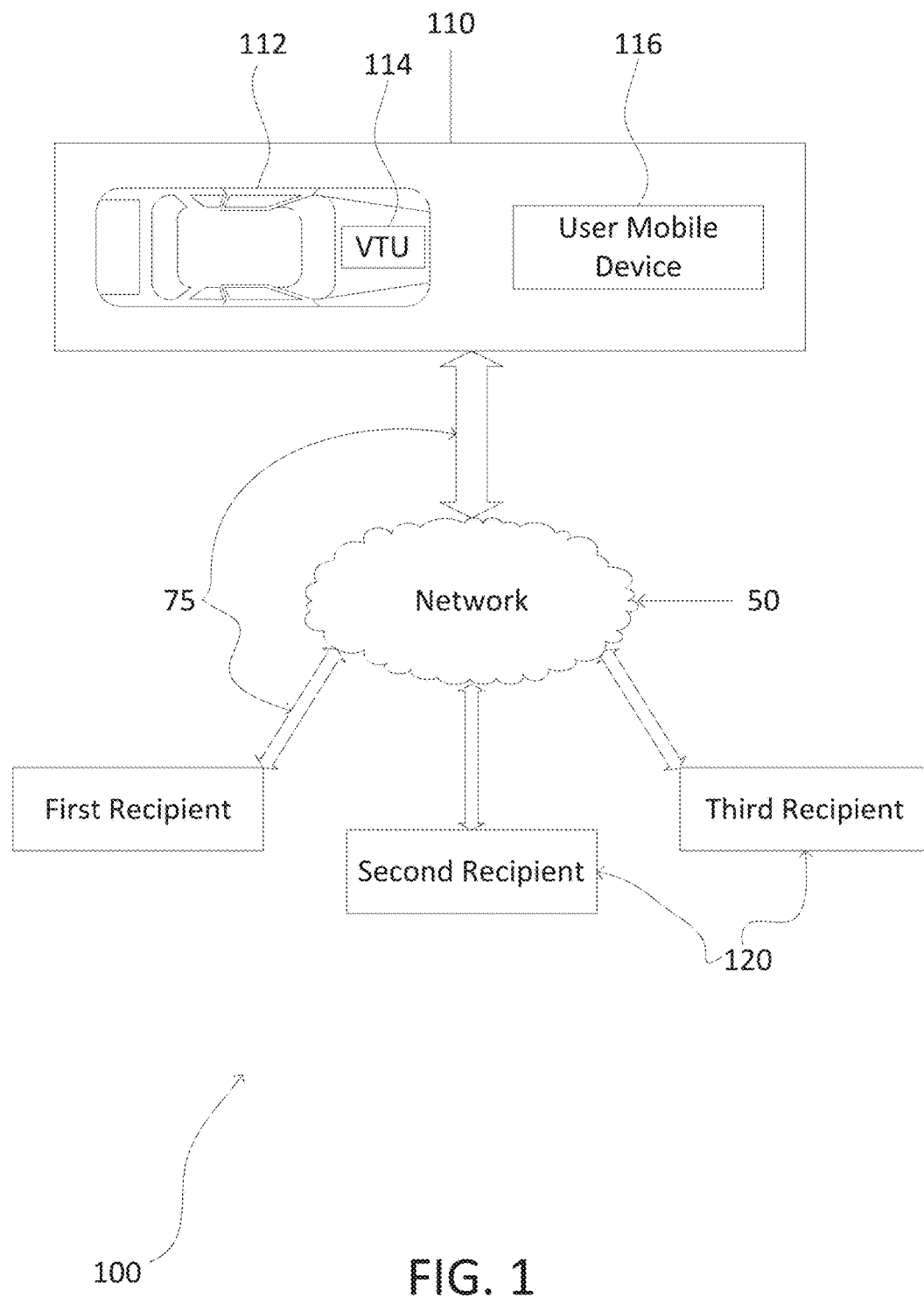
FIG. 1 depicts one embodiment of the system for utilizing the embodiment(s) described herein.

The present disclosure is directed to facilitating the communication of information about a vehicle incident, such as a car accident. It is to be appreciated the subject invention is described below more fully with reference to the accompanying drawings, in which illustrated embodiments of the present invention are shown. The present invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof as known to those skilled in the art, and so forth.

It is to be appreciated that certain embodiments of this invention as discussed below are a software algorithm, program or code residing on computer useable medium having control logic for enabling execution on a machine having a computer processor. The machine typically includes memory storage configured to provide output from execution of the computer algorithm or program. As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the invention based on the above-described embodiments. Accordingly, the invention is not to be limited by what has been particularly shown and described, except as indicated by the appended claims. Further, although at least one series of steps are presented as an exemplary method of practicing one or more embodiments described herein, it will be appreciated by those skilled in the art that the steps identified may be practiced in any order that is practicable, including without limitation the omission of one or more steps.

Referring to FIG. 1, a hardware diagram depicting a system 100 in which the processes described herein can be executed is provided for exemplary purposes. In one example, system 100 includes vehicular unit 110, network 50, communication links 75, and recipients 120. Vehicular unit 110 may include a vehicle 112 (e.g., a car), a vehicular telematics unit 114, and a user mobile device 116 (e.g., a cell phone). Exemplary embodiments of user mobile devices 116 include but are not limited to mobile devices, such as a multifunction "smart phones", personal computers, notebook computers, and tablet computers.

Referring further to FIG. 1, it is to be appreciated that network 50 depicted in FIG. 1 may include a local area network (LAN), a wide area network (WAN), a personal area network (PAN), and/or combinations thereof. Such networking environments are commonplace in offices, enterprise-wide computer networks, intranets, and the Internet. For instance, when used in a LAN networking environment, the system 100 is connected to the LAN through a network interface or adapter (not shown). When used in a WAN networking environment, the computing system environment typically includes a modem or other means for establishing communications over the WAN, such as the Internet. The modem, which may be internal or external, may be connected to a system bus via a user input interface, or via another appropriate mechanism. In a networked environment, program modules depicted relative to the system 100, or portions thereof, may be stored in a remote memory storage device such as storage medium. Communication links 75 may comprise either wired or wireless links. It is to be appreciated that the illustrated network connections of FIG. 1 are exemplary and other means of establishing a communications link between multiple devices may be used.

Figure 2:
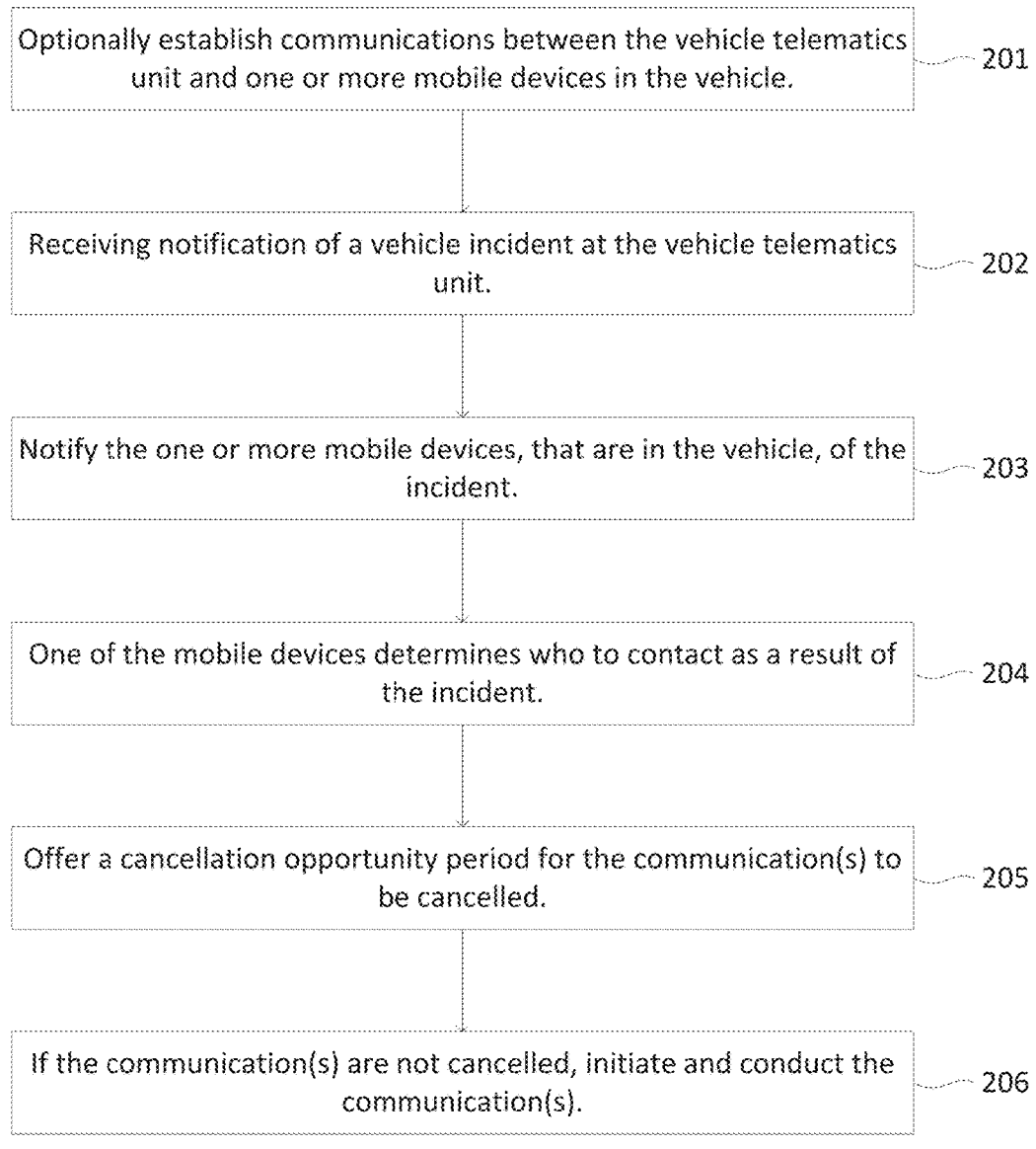
FIG. 2 is a flowchart depicting an illustrative operation of the embodiment(s) described herein.

Referring to FIG. 2, exemplary operation of a process 200 of system 100 will now be described for illustrative purposes. Starting at step 201, communications may optionally be established between vehicle telematics unit (VTU) 114 and user mobile device 116. This communication may be in anticipation of a future accident occurring, and/or it may be incidental to an accident and instead related to other functionality (e.g., VTU 114 may establish communications (e.g., Bluetooth®) with user mobile device 116 for a phone call).

Then, a notification is received at VTU 114 that an accident occurred (step 202). The notification may be in the form of raw sensor data that VTU 114 analyzes to determine that the likelihood that an accident occurred has exceeded a threshold. For example, the sensor data may relate to an airbag being activated, to car damage being detected, to an acceleration (including a deceleration) that exceeds an acceleration threshold, and/or any other data that might be indicative of an accident. Alternatively, the notification that VTU 114 receives may instead be an internally generated signal (e.g., a signal that VTU 114 generates) based on measurements and analysis internal to VTU 114.

Subsequently, VTU 114 notifies a user mobile device 116, such as user mobile device 116 inside the vehicle (step 203). It is contemplated herein that VTU 114 may notify one or more user mobile devices 116 of the accident, either contemporaneously and/or consecutively. Then, the user mobile device(s) 116 may query an internal database and/or retrieve data (such as data located internal to user mobile device(s) 116) to identify one or more recipients to contact (step 204). For example, the recipients may be identified as a family member, an emergency responder, a tow truck operator, a rental car company, a party for whom an upcoming meeting is scheduled and will now need to be rescheduled, etc.

Then, a cancellation opportunity period (COP) is presented (step 205) for one or more users to cancel the second level communications contemplated in step 204. If the second level communications are not cancelled at step 205, then the communications from user mobile device(s) 116 to recipients 120 is commenced (step 206).

It is to be appreciated that the specific order of steps, and the specific actions, detailed in process 200 in FIG. 2 are exemplary only, and variations of process 200 are contemplated herein. For example, the initial step of establishing communications between VTU 114 and user mobile device(s) 116 need not occur (as should be evident from the preface to that step of "optionally"). In another alternative example, user mobile device(s) 116 may not identify what parties (one or more parties) to contact (step 204) until after the cancellation period expires (step 205) and/or during the cancellation period.

In one embodiment, with reference to FIG. 1, the systems and methods for facilitating vehicle incident communication may forego use of vehicular telematics unit 114 to detect and/or determine that an accident has occurred involving vehicle 112. Instead, user mobile device 116 may perform the detection and determination of the accident. In such an embodiment, user mobile device 116 may comprise a wearable computing device, such as a smartwatch or optical head-mounted display device. It is also specifically contemplated that vehicle 112 may contain more than one occupant, each with an associated user mobile device 116. As will be discussed further herein, the multiple user mobile devices 116 may be communicatively connected with one another, such as via a short-range radio frequency protocol (e.g., Bluetooth®), to enhance the accident detection and accident notification functionality disclosed herein.

Figure 3:
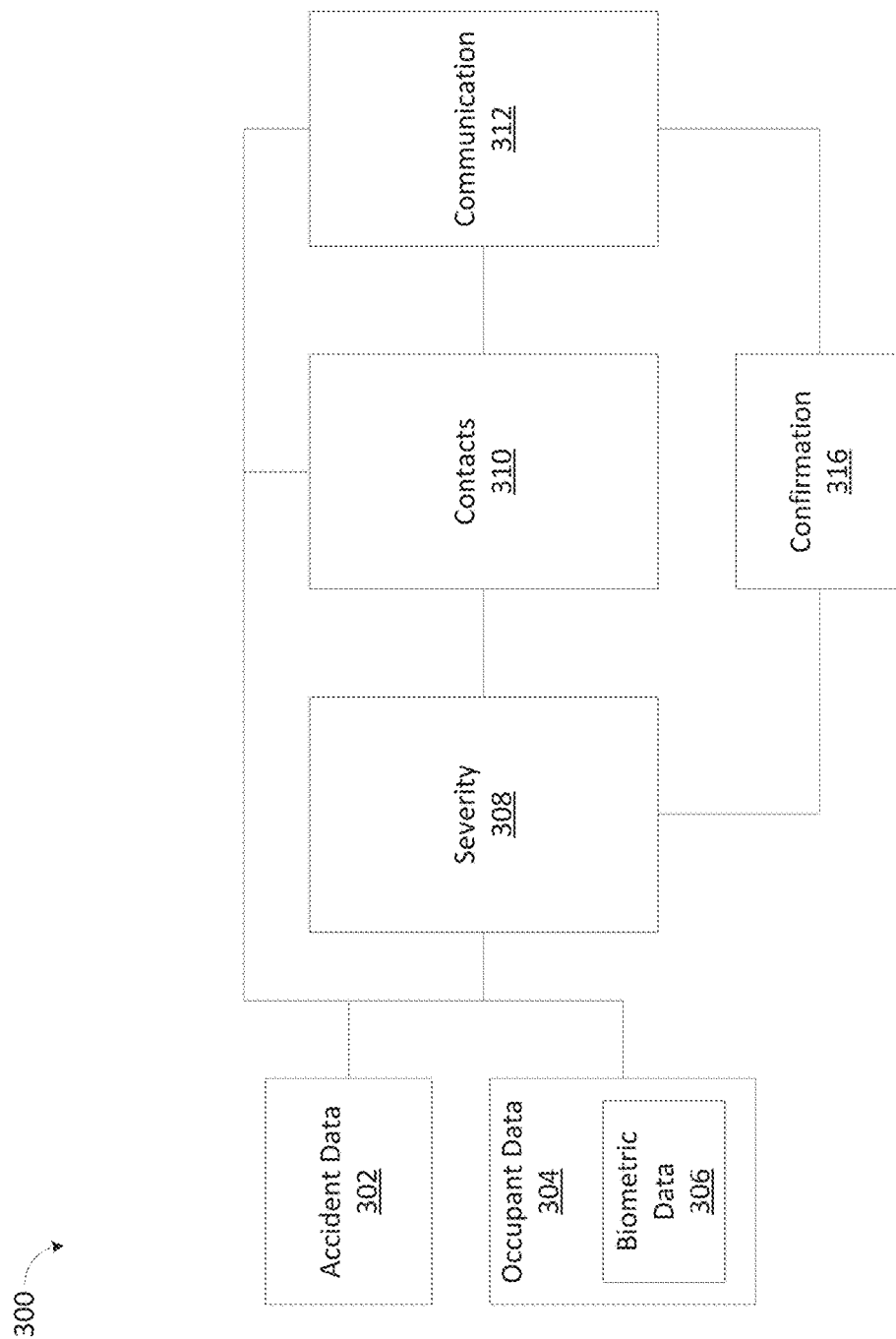
FIG. 3 is a data flowchart of various operations relating to systems and methods described herein.

FIG. 3 illustrates an exemplary flow diagram 300 of various operations relating to systems and methods for facilitating vehicle incident communication using a mobile device, such as a wearable computing device. By way of introduction, an accident involving vehicle 112 may be detected by user mobile device 116. Severity 308 of the accident may be determined according to accident data 302 and/or occupant data 304, including biometric data 306. If severity 308 is above a pre-determined threshold, one or more contacts 310 may be determined to be notified of the accident. In some instances, one or more of the occupants using user mobile device 116 may be prompted to provide confirmation 316 that contacts 310 should be notified. Communication 312 may accordingly be transmitted to contacts 310.

Accident data 302 may include data representing various aspects of the accident, including that the accident has occurred and the circumstances of the accident (e.g., the speed, bearing, and/or orientation of vehicle 112 prior to and/or during the accident and/or the forces experienced during the accident). Accident data 302 may be determined by user mobile device 116 and may be based on data from one or more sensors incorporated into user mobile device 116. For example, user mobile device 116 may include an inertial measurement unit (IMU) comprising an accelerometer and/or gyroscope. The IMU may, for example, detect the rapid deceleration associated with an automobile accident. The IMU may further detect the speed of vehicle 112, such as the speed at the time of the accident. As higher speeds tend to produce more severe accidents, the speed of vehicle 112 at the time of the accident may help inform the determination of severity 308. As yet another example, the IMU may detect whether vehicle 112 has rolled over during the accident and/or has come to rest in an overturned state, which may tend to indicate that the accident is a high severity. User mobile device 116 may be equipped with an audio sensor (e.g., a microphone) which may be configured to detect the unique audio signature of breaking glass or the sound of an impact, both of which may occur in an accident. As another example, user mobile device 116 may include a global positioning system (GPS) receiver or other means for determining the geographical location of vehicle 112 which may be used in communication 312 to inform contacts 310 of the location of the accident.

Occupant data 304 may include data reflecting various aspects of the occupants of vehicle 112 at the time of the accident. For example, occupant data 304 may include an indication of the number of occupants and whether and which occupants have a user mobile device configured according to the present disclosure. Occupant data 304 may include biographical data for an occupant, such as name, age, gender, weight, height, or ethnicity. Biographical data may be useful when included in communication 312 to assist the notified emergency personnel in identifying each occupant, for example. Occupant data 304 may further include medical data pertaining to an occupant. For example, medical data may include blood type, allergies (e.g., an allergy to penicillin), or medical conditions (e.g., diabetic) of an occupant. When included in communication 312 to emergency personnel, such as a paramedic, the medical data may assist the emergency personnel in providing medical care to the occupant. For instance, medical data indicating that the occupant has a certain blood type may allow the emergency personnel to ensure that they have that blood type on board the ambulance when the ambulance sets out to the location of the accident. Occupant data 304 may also be used as a basis for the determination of severity 308. As an example, occupant data 304 indicating that the occupant is elderly and suffers from osteoporosis may cause severity 308 to be treated as higher than if the occupant was young and of sound body.

Occupant data 304 may additionally include biometric data 306 pertaining to various biological aspects of the occupant. User mobile device 116 may be equipped with one or more sensors configured to detect biometric data 306. For example, user mobile device 116 may include a heartrate sensor, a breathing rate monitor, a body temperature sensor, a pulse oximeter, and/or a moisture sensor. Accordingly, biometric data 306 may include a heartrate of the occupant, a breathing rate of the occupant, the occupant's temperature, the oxygen saturation level of the occupant, and/or a degree to which the occupant is sweating. User mobile device 116 may also include a motion sensor that detects if and to what degree user mobile device 116 (and thus also a part of the occupant's body to which user mobile device 116 may be attached or coupled) is moved. If, for example, user mobile device 116 detects no movement of user mobile device 116, this may indicate that the occupant is unconscious and thus requires prompt medical attention.

Severity 308 may reflect the severity of the accident involving vehicle 112. For example, severity 308 may represent a likelihood that one or more occupants of vehicle 112 are injured and require medical assistance. Examples of accidents in which severity 308 may be high include a high-speed collision, a head-on collision, or a roll-over accident. Examples of accidents in which severity 308 may be low include a low-speed collision or a bumper-to-bumper collision. Severity 308 may be embodied as a numerical value, including a numerical value within a pre-defined range of possible numerical values (e.g., 6 out of 10). Severity 308 may be based, at least in part, on accident data 302. As one example, accident data 302 may indicate that user mobile device 116 (and thus likely also vehicle 112 in which user mobile device 116 is within) was subject to a sudden, large deceleration and that user mobile device 116 detected the sound of glass breaking. In such an instance, severity 308 may reflect that the accident was of a high severity. On the other hand, accident data 302 may indicate that user mobile device 116 experienced only slight deceleration and that no sounds of breaking glass or an overturning of vehicle 112 were detected. In this case, severity 308 may reflect that the accident was of a low severity.

Severity 308 may further be determined based, at least in part, on occupant data 304, including biometric data 306. For example, severity 308 may be determined to be a high severity if biometric data 306 indicates that the occupant has a fast heartrate and is sweating profusely following the accident. As an extreme example, if biometric data 306 indicates that the occupant has no heartrate and is not moving, severity 308 may be determined to be a maximum level of severity. Conversely, if biometric data 306 indicates that the occupant has a normal heartrate, a normal breathing rate, and is not sweating an elevated amount, severity 308 may be determined to be a lower severity. As another example, severity 308 may be determined to be higher than severity 308 would be otherwise if biographical or medical data included in occupant data 304 indicates one or more aspects of vulnerability, such as if the occupant is elderly or an infant or if the occupant suffers from a medical condition which may make the occupant particularly susceptible to injury in an accident.

One or more contacts 310, such as the recipients 120 depicted in FIG. 1, to which communication 312 is transmitted may be determined, such as by user mobile device 116. In an aspect, determining contacts 310 may include selecting one or more contacts from a pre-defined listing of contacts. For example, the pre-defined listing of contacts may include a contact for a relative of the occupant, a contact for a towing service, a contact for non-emergency police services, and a contact for emergency services. The determination of contacts 310 may include, for example, selecting the contact for the towing service and the contact for the non-emergency police service, such as in the case of a less severe accident involving no injuries to the occupants.

Contacts 310 may be determined according to severity 308. For instance, if severity 308 reflects that the accident was of a high severity (e.g., a high-speed head-on collision), contacts 310 may be determined to include a contact for emergency services, such as an emergency police service and/or an emergency medical service. Conversely, if severity 308 indicates that the accident was of a lower severity (e.g., a low-speed bumper-to-bumper collision), contacts 310 may be determined to include a contact for a towing service, while foregoing an emergency medical or police service, for example.

Contacts 310 may further be determined based on accident data 302 and/or occupant data 304. For example, the location of the accident included in accident data 302 may inform the determination of contacts 310 to include a contact associated with the location of the accident, such as a local towing service, a local police department, or a local emergency service. With respect to occupant data 304, contacts 310 may be determined according to the identification of the occupant. For example, contacts 310 for a first occupant may include a relative of the first occupant and contacts 310 for a second occupant may include a relative of the second occupant.

In some aspects, an occupant involved in a detected accident may be provided with an opportunity to provide confirmation 316. Confirmation 316 may comprise a confirmation or disconfirmation that the accident occurred and/or may comprise a confirmation or cancellation of communication 312 being sent. As part of confirmation 316, a countdown may be initiated, at the end of which confirmation 316 may be determined. For example, a countdown may be provided during which the occupant may disconfirm that the accident occurred. If the occupant does not disconfirm that the accident occurred before the countdown reaches zero, the accident may be presumed to have occurred and confirmation 316 comprises an indication that the accident occurred. As another example, a countdown may be provided during which the occupant may cancel a proposed transmission of communication 312. If communication 312 is not canceled before the countdown reaches zero, communication 312 may be transmitted, such as to contacts 310.

Figure 4:
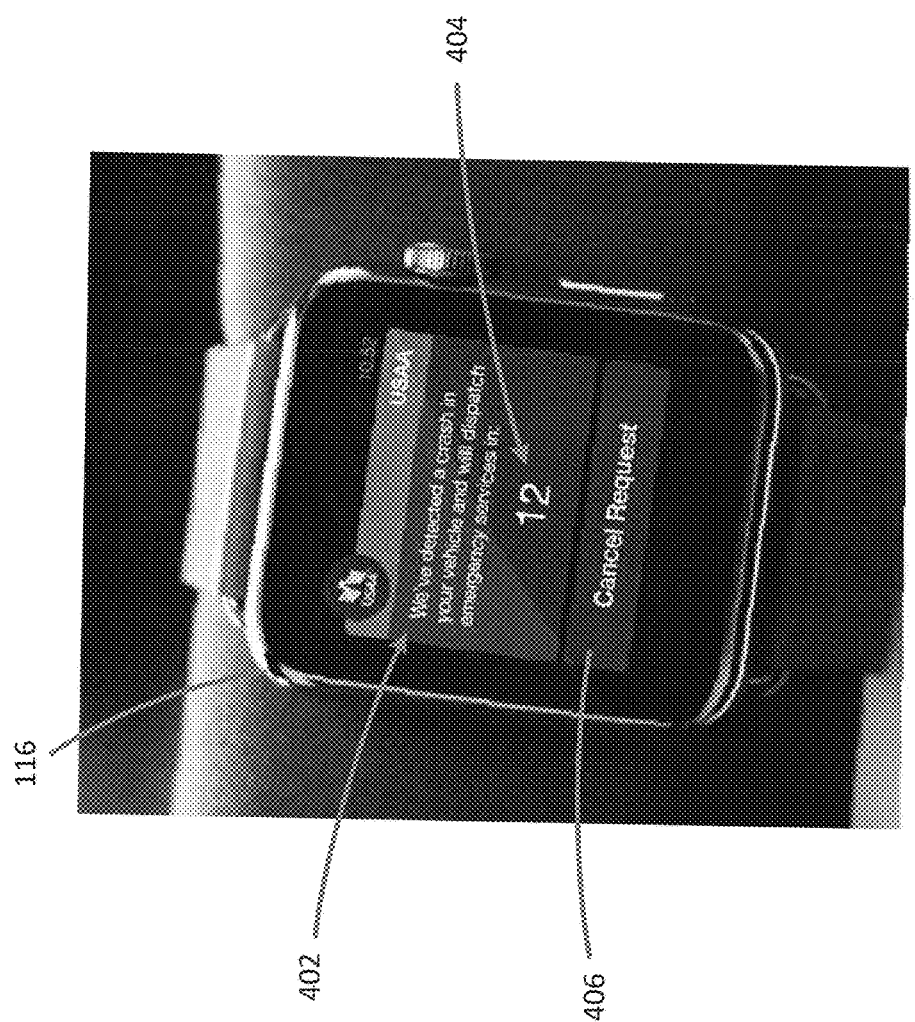
FIG. 4 depicts an exemplary user interface.

Confirmation 316 and an associated countdown may be received and/or provided by a user interface of user mobile device 116. As an example, FIG. 4 depicts an exemplary embodiment of user mobile device 116, a smartwatch in this case. User mobile device 116 includes a user interface in which message 402 indicates to the occupant that an accident has been detected and a communication will be sent to emergency services. Interactive element 406 is included in the user interface via which the occupant may cancel the communication to the emergency services. Countdown 404 is provided in the user interface to indicate the length of time before the communication is sent. If the occupant fails to activate interactive element 406 before countdown 404 reaches zero, it will be deemed that the occupant has confirmed the transmission of the communication.

While it is contemplated that confirmation 316 may be explicitly provided by the occupant, in some aspects confirmation 316 may be implicitly provided, such as by the conduct of the occupant and/or operation of vehicle 112. For example, if a countdown is initiated to transmit proposed communication 312, a cancellation of the transmission may be inferred upon detection that the occupant is operating vehicle 112 and/or that vehicle 112 is moving.

Referring again to FIG. 3, whether an occupant is prompted for confirmation 316 may depend on severity 308. For example, if severity 308 indicates that the accident was a high severity, confirmation 316 and/or an associated countdown may be bypassed and communication 312 may be immediately transmitted to contacts 310. Yet if severity 308 indicates that the accident was a low severity, the occupant may be prompted for confirmation 316 and/or with an associated countdown.

In one aspect, if the occupant cancels communication 312 or disaffirms that the accident has occurred, the occupant may be provided, such as via a user interface of user mobile device 116, with one or more suggested contacts that are alternatives to the contacts that communication 312 would otherwise have been transmitted to. The occupant may select one or more of the suggested contacts and the selected contact(s) may serve as contacts 310. Additionally or alternatively, the occupant may specify, such as via a user interface of user mobile device 116, one or more alternative contacts to serve as contacts 310 and to whom communication 312 will be sent. As an example, if an occupant cancels a proposed communication to an emergency service, the occupant may be provided with alternative contacts comprising a towing service and a relative of the occupant. The occupant may select, for example, the towing service to serve as contact 310 and to be sent communication 312.

In instances in which multiple occupants, each with an associated user mobile device 116, are present in vehicle 112, there may be an inconsistency between the multiple user mobile devices' 116 determinations of whether an accident has occurred and/or severity 308. A first user mobile device 116 may determine that an accident has occurred while a second user mobile device 116 may not have determined that the accident has occurred, for example. The inconsistency may be resolved by prompting, via each respective user mobile device 116, each occupant for confirmation 316 and transmitting communication 312 accordingly. For example, if both occupants associated with the first user mobile device 116 and the second user mobile device 116, respectively, each confirm that the accident has occurred, communication 312 may be transmitted. In one aspect, if confirmations 316 are inconsistent (e.g. one occupant confirms and another disconfirms or cancels), communication 312 is transmitted. In another aspect, if confirmations 316 are inconsistent, the accident is deemed to not have occurred and/or communication 312 is not transmitted. In yet another aspect, if confirmations 316 are inconsistent, the occupants may be prompted, such as via the user interface of user mobile device 116, with an additional question. For example, an additional question may be directed to whether the occupant meant to provide the prior input (e.g., the confirmation, disaffirmation, or cancellation).

In another aspect involving multiple occupants and user mobile devices 116 in vehicle 112, instead of prompting each occupant for confirmation 316, one occupant—and associated user mobile device 116—may be designated as the controlling occupant. Only the controlling occupant may be prompted to provide confirmation 316. The controlling occupant and associated user mobile device 116 may also serve as the primary means for determining contacts 310 and/or transmitting communication 312. For example, the controlling user mobile device 116 associated with the controlling occupant may communicate with other user mobile devices 116 in vehicle 112 to gather data to determine communication 312, such as an emergency contact (e.g., a family member) and/or occupant data 304 for each of the other occupants. The controlling user mobile device 116 may aggregate the received contacts and use them as contacts 310 for one or more communications 312.

Communication 312 may be transmitted 312 to one or more contacts 310 indicating that an accident has occurred. Communication 312 may be determined and/or transmitted by user mobile device 116. In some instances, communication 312 may be transmitted directly from user mobile device 116 to contacts 310. However, it is specifically contemplated that the transmission of communication 312 may involve one or more intermediaries. For example, user mobile device 116 may transmit communication 312 to a central server at which the central server relays communication 312 to contacts 310, such as an emergency service local to the site of the accident.

Communication 312 may be based, at least in part, on accident data 302, occupant data 304, including biometric data 306, and/or severity 308. For example, communication 312 may include the geographic coordinates or address of the accident included in accident data 302, the name, age, and gender of the occupant included in occupant data 304, and the current heartrate of the occupant included in biometric data 306. Communication 312 may further include an indication of the severity of the accident included in severity 308, for example, so that emergency service personnel may be prepared to provide an appropriate treatment to the occupant. As another example, occupant data 304 may indicate that vehicle 112 involved in the accident held five occupants so that an emergency services dispatcher may dispatch multiple ambulances to the site of the accident. As yet another example, based on biometric data 306 for multiple occupants, communication 312 may indicate which of the multiple occupants is the most injured.

Figure 5:
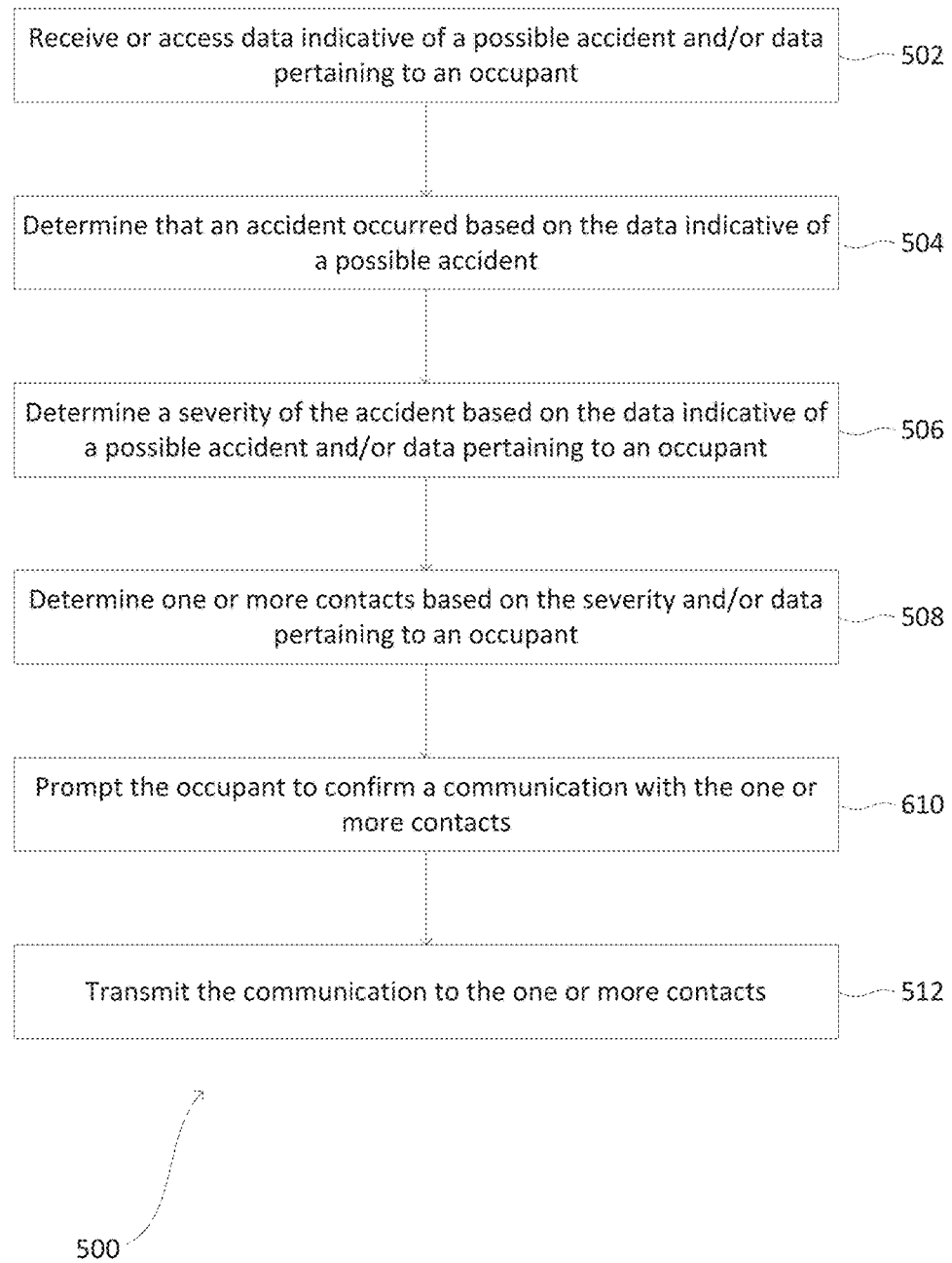
FIG. 5 is a flowchart depicting an illustrative operation of the embodiment(s) described herein.

FIG. 5 illustrates a process flow chart for an exemplary method 500 of facilitating vehicle incident communications. For illustrations purposes, FIG. 5 will be discussed with continued reference to FIGS. 1 and 3. At step 502, data indicative of a possible accident, such as accident data 302, and/or data pertaining to an occupant, such as occupant data 304, may be accessed or received. The data indicative of a possible accident and/or the data pertaining to an occupant may be accessed or received, for example, by user mobile device 116 associated with the occupant. For example, user mobile device 116 may access or receive data from a sensor disposed on user mobile device 116 that indicates that user mobile device 116, and thus likely also vehicle 112, underwent a rapid deceleration and that glass was broken in the near vicinity of user mobile device 116. As discussed above in more detail, data pertaining to the occupant may include biographical data (e.g., as name, weight, gender, medical conditions, etc.) and/or biometric data, such as biometric data 306 (e.g., heart rate, breathing rate, temperature, etc.).

At step 504, based at least on the data indicative of a possible accident, an accident is determined to have occurred. The determination that the accident occurred may be performed by user mobile device 116. As an example, an accident may be determined to have occurred based on the rapid deceleration detected by a sensor of user mobile device 116 and the detected sound of breaking glass in the vicinity of user mobile device 116. The determination of the accident having occurred may comprise a comparison of an aspect of the data indicative of a possible accident, such as the number of g forces experienced in the rapid deceleration, against a pre-defined threshold.

At step 506, a severity of the accident, such as severity 308, may be determined based, at least in part, on the data indicative of a possible accident and/or data pertaining to the occupant. The severity of the accident may be determined, for example, by user mobile device 116. The severity of the accident may reflect a likelihood that the occupant was injured in the accident. For instance, if the data indicative of a possible accident reflects that vehicle 112 was traveling at a high speed at the time of the accident and that vehicle 112 experienced a roll-over, the severity of the accident may be determined to be high. The severity of the accident may also be determined based on data pertaining to the occupant. For example, if the data pertaining to the occupant indicates that the occupant has a medical condition that renders the occupant vulnerable to physical injury, the severity of the accident may be determined to be higher than it would otherwise. As another example, if the data pertaining to the occupant includes biometric data indicating that the occupant is no longer breathing and no longer has a pulse (i.e. the occupant is unconscious), this may result in the severity of the accident being deemed high. As discussed above, the severity of the accident may be embodied as a numerical value.

At step 508, one or more contacts, such as contacts 310, are determined based, at least in part, on the severity of the accident and/or the data pertaining to the occupant. The one or more contacts may be determined by user mobile device 116. For example, a contact corresponding to a relative of the occupant may be determined according to the identification of the occupant in the data pertaining to the occupant. Whether to include an emergency service as a determined contact may be based on the severity of the accident. For example, if the severity of the accident is high, the emergency service may be included as a contact. Conversely, if the severity of the accident is low, the emergency service may be excluded as a contact in favor of a relative of the occupant, for example. In an aspect, the one or more contacts may be determined according to other data concerning the accident, such as accident data 302. For example, the location of the accident may inform which local emergency service is included as a contact (e.g., the emergency service of the locale in which the accident occurred).

At step 510, the occupant may be prompted to provide a confirmation, such as confirmation 316, of a proposed communication relating to the accident to be transmitted to the determined contact(s). The confirmation may be prompted to the occupant via a user interface of user mobile device 116 and the occupant may provide the occupant's confirmation via the user interface of user mobile device 116. In an aspect, the occupant may provide an affirmative confirmation that the accident occurred and/or that the communication should be transmitted. In another aspect, the occupant may be provided with a countdown and prompted to cancel the transmission of the communication and/or disconfirm that the accident occurred. If the countdown expires, the occupant is deemed to have confirmed that the accident occurred and/or that the communication should be transmitted. In some aspects, the prompting for and provision of the confirmation may be omitted if the severity of the accident is sufficiently high (e.g., the severity of the accident is greater than a pre-defined threshold). In which case, the method 500 may proceed to transmit the communication, as described below.

At step 512, the communication, such as communication 312, may be transmitted to the determined contact(s). The communication may be transmitted by user mobile device 116 and may serve to notify the contact(s) of the accident. The transmission of the communication may be responsive to the confirmation provided by the occupant. However, it is specifically contemplated that the method 500 may not include prompting for and receiving a confirmation from the occupant. The communication may include data pertaining to the accident, such as the geographic coordinates and/or address of the accident, and/or the severity of the accident. The communication may further include data pertaining to the occupant, such as the name, age, gender, and medical conditions of the occupant and biometric data relating to the occupant.

Figure 6:
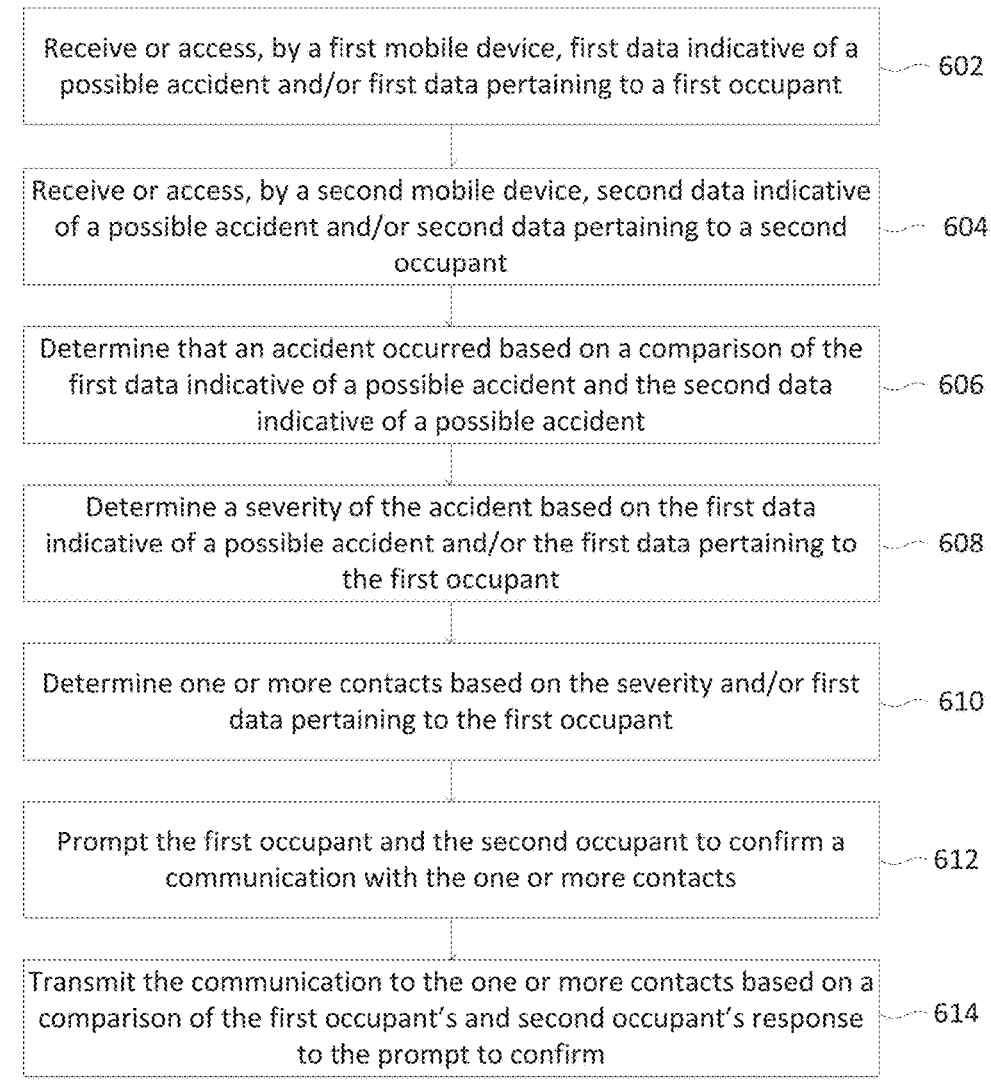
FIG. 6 is a flowchart depicting an illustrative operation of the embodiment(s) described herein.

FIG. 6 illustrates a process flow chart for an exemplary method 600 of facilitating vehicle incident communications, in particular when multiple user mobile devices 116 are present in vehicle 112. For illustrations purposes, FIG. 6 will be discussed with continued reference to FIGS. 1 and 3. At step 602, first data indicative of a possible accident, such as accident data 302, and/or first data pertaining to a first occupant, such as occupant data 304, may be accessed or received by a first mobile device, such as user mobile device 116 associated with (e.g., worn by) the first occupant. At step 604, second data indicative of a possible accident, such as accident data 302, and/or second data pertaining to a second occupant, such as occupant data 304, may be accessed or received by a second mobile device, such as user mobile device 116 associated with (e.g., worn by) the second occupant. As examples, the first and second data indicative of a possible accident may include data from a sensor disposed on the respective mobile device, such as deceleration data. Also as examples, the first and second data pertaining to the first and second occupants, respectively, may include biographical data and/or biometric data, such as biometric data 306, associated with the respective occupant.

At step 606 it may be determined that an accident has occurred based on a comparison of the first data indicative of a possible accident and the second data indicative of a possible accident. For example, if the first data indicative of a possible accident indicates that the first mobile device underwent a large deceleration and the second data indicative of a possible accident indicates that the second mobile device also underwent a similarly large deceleration, it may be determined that the accident occurred. As another example, if the first data indicative of a possible accident indicates that the first mobile device underwent a large deceleration and the second data indicative of a possible accident indicates that the second mobile device underwent a minor (or no) deceleration, it may be determined that no accident occurred. Alternatively in such a case, the first and second occupants may each be presented, such as via the first and second mobile devices, respectively, with a prompt to manually input whether an accident occurred. The determination that an accident occurred may further include a comparison of an aspect of one or more of the first and second data indicative of a possible accident with a predetermined threshold. The determination that an accident occurred may be performed by the first mobile device and/or the second mobile device.

At step 608, a severity of the accident, such as severity 308, may be determined based, at least in part, on the first data indicative of a possible accident and/or the first data pertaining to the first occupant. The severity of the accident may be determined by the first and/or second mobile devices. In an aspect, the severity may be determined further based on the second data indicative of a possible accident and/or the second data pertaining to the second occupant. As an example, if first data indicative of a possible accident reflects that vehicle 112 experienced a large deceleration, the severity of the accident may be determined to be a high severity. As another example, if first data indicative of a possible accident reflects that vehicle 112 experienced a large deceleration, yet the first data pertaining to the first occupant indicates that the first occupant has a normal heartrate, a normal breathing rate, and is moving, the severity of the accident may be determined to be an intermediate severity.

At step 610, one or more contacts, such as contacts 310, may be determined based on the severity of the accident and/or the first data pertaining to the first occupant. In an aspect, the contact(s) may be determined further based on the second data pertaining to the second occupant. The contact(s) may be determined by the first and/or second mobile devices. For example, a first contact for a relative of the first occupant may be determined based on an indication of the relative in the first data pertaining to the first occupant and a second contact for a relative of the second occupant may be determined based on an indication of the relative in the second data pertaining to the second occupant. In an aspect, the contact(s) may be determined based on other data concerning the accident, such as accident data 302, including the location of the accident.

At step 612, the first occupant and the second occupant may each be prompted to provide a confirmation, such as confirmation 316, of a proposed communication relating to the accident to be transmitted to the determined contact(s). The prompt for and receipt of each confirmation may be performed via user interfaces of the first and second mobiles devices, respectively. The confirmation provided by the first or second occupant may comprise an affirmative confirmation that the accident occurred and/or that the communication should be transmitted. As another example, the first and/or second occupant may each be presented with a countdown, at the end of which the respective first and/or second occupant is deemed to have provided his or her confirmation. The first and/or second occupant may each be provided with an option to cancel the countdown, wherein if the first and/or second occupant exercise the option to cancel, the communication will be canceled and/or the accident will be disconfirmed to have occurred.

At step 614, the communication may be transmitted to the determined contact(s) based on a comparison of the first occupant's response to the prompt to provide the first occupant's confirmation and the second occupant's response to the prompt to provide the second occupant's confirmation. For example, if the first occupant and second occupants both provide their confirmation, the communication may be transmitted. If neither the first occupant nor the second occupant provide their confirmation, the communication will not be transmitted. In the event that one of the occupants provides the confirmation and another does not, this may be addressed in a number of ways. In one aspect, if at least one occupant confirms that the communication should be sent, the confirmation will be deemed applicable to all occupants and the communication will be sent. In another aspect, if at least one occupant does not provide a confirmation, this will be deemed applicable to all occupants and the communication will not be sent. In yet another aspect, each of the occupants may be prompted to provide an additional input as to whether the prior input was intended.

Figure 7:
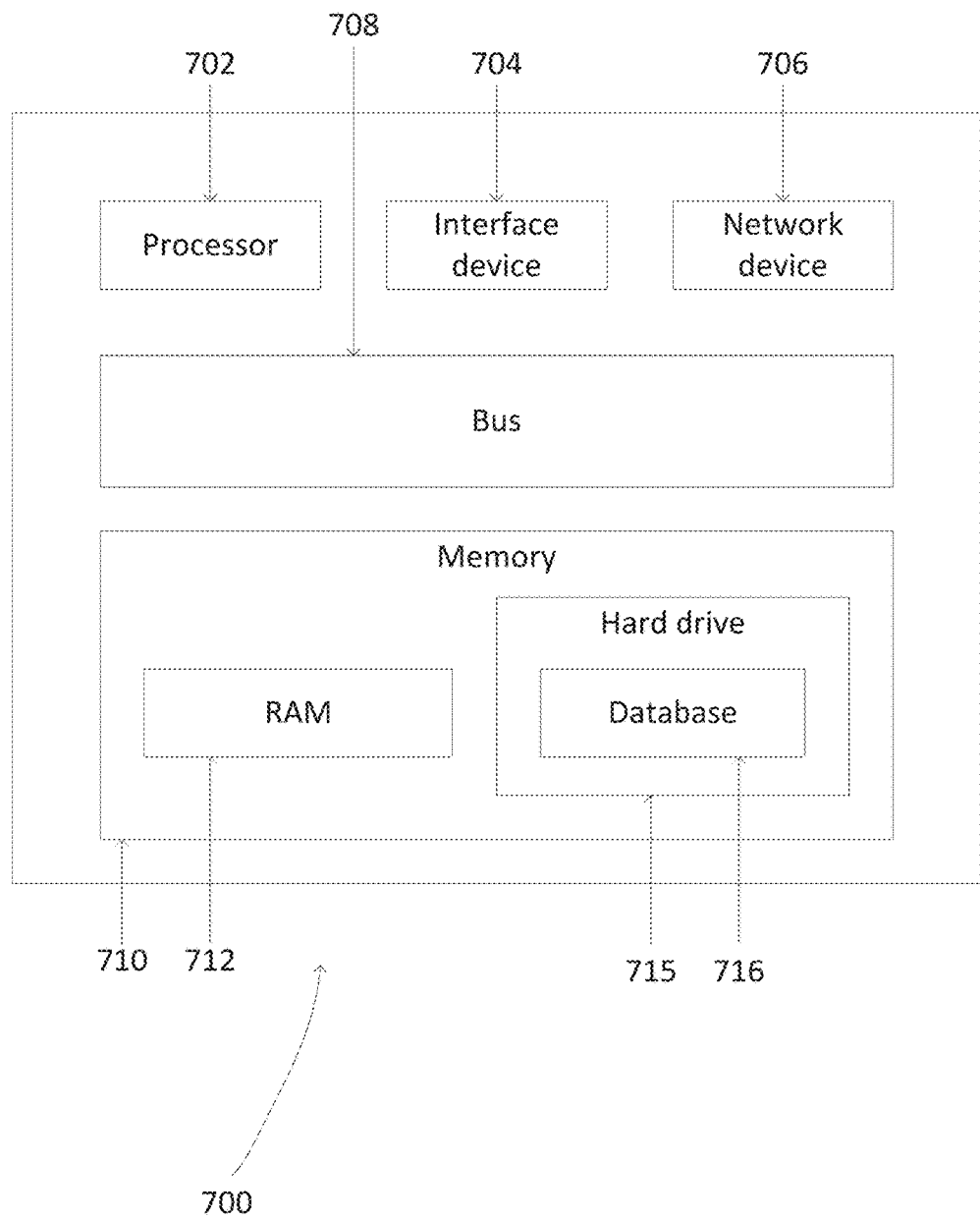
FIG. 7 depicts an exemplary computing device as might be utilized in coordination with the systems and methods described herein.

Referring to FIG. 7, illustrated therein is an exemplary embodiment of a computing device as might be used when utilizing the systems and methods described herein. In one embodiment, computing device 700 includes memory 710, a processor 702, an interface device 704 (e.g., mouse, keyboard, monitor), a network device 706. Memory 710 in one example comprises a computer-readable signal-bearing medium. One example of a computer-readable signal-bearing medium comprises a recordable data storage medium, such as a magnetic, optical, biological, and/or atomic data storage medium. In another example, a computer-readable signal-bearing medium comprises a modulated carrier signal transmitted over a network coupled with system 100, for instance, a telephone network, a local area network ("LAN"), the Internet, and/or a wireless network. In one example, memory 710 includes a series of computer instructions written in or implemented with any of a number of programming languages, as will be appreciated by those skilled in the art.

Memory 710 in one example includes RAM 712, hard drive 715, which may include database 716. Database 716 in one example holds information, such as information that relates to users and/or parties interacting with system 100.

The terms "engine" and "module" denote a functional operation that may be embodied either as a stand-alone component or as an integrated configuration of a plurality of subordinate components. Thus, engines and modules may be implemented as a single engine/module or as a plurality of engine/modules that operate in cooperation with one another. Moreover, engines/modules may be implemented as software instructions in memory 710 or separately in any of hardware (e.g., electronic circuitry), firmware, software, or a combination thereof. In one embodiment, engines/modules contain instructions for controlling processor 702 to execute the methods described herein. Examples of these methods are explained in further detail in the subsequent of exemplary embodiments section-below.

The techniques described herein are exemplary, and should not be construed as implying any particular limitation on the present disclosure. It should be understood that various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

The terms "comprises" or "comprising" are to be interpreted as specifying the presence of the stated features, integers, steps or components, but not precluding the presence of one or more other features, integers, steps or components or groups thereof.

Although the systems and methods of the subject invention have been described with respect to the embodiments disclosed above, those skilled in the art will readily appreciate that changes and modifications may be made thereto without departing from the spirit and scope of the subject invention.

What is claimed is:

1. A method for providing a communication about at least one vehicle, the method comprising:
  receiving, by a mobile device, data indicative of a possible vehicular accident;
  determining, by the mobile device, based on the indicative data, that a vehicular accident occurred;
  determining a severity of the vehicular accident;
  accessing, by the mobile device, data identifying a plurality of contacts associated with the vehicle;
  selecting, by the mobile device and based on the determination that the vehicular accident occurred, a first contact of the plurality of contacts and a second contact of the plurality of contacts;
  generating, by the mobile device, a first communication relating to the vehicular accident comprising first content determined based on the first contact;
  generating, by the mobile device, a second communication relating to the vehicular accident comprising second content determined based on the second contact;
  when the severity of the vehicular accident is high:
    automatically electronically transmitting, by the mobile device, the first communication to the first contact and the second communication to the second contact; and
  when the severity of the vehicular accident is low:
    prompting a user of the mobile device to confirm communication transmission; and
    based on confirmation of the communication transmission, electronically transmitting, by the mobile device, the first communication to the first contact and the second communication to the second contact.

2. The method of claim 1, wherein at least one of the first contact or the second contact is selected based at least on the severity of the vehicular accident.

3. The method of claim 1, wherein the determining the severity of the vehicular accident is based at least on data indicative of an aspect of an occupant of the vehicle.

4. The method of claim 1, wherein the prompting the user to confirm the communication transmission further comprises providing a countdown, wherein an expiration of the countdown comprises the user confirming the proposed transmission.

5. The method of claim 1, wherein the mobile device comprises a wearable mobile device.

6. The method of claim 1, wherein the data indicative of the possible vehicular accident is received from a vehicle telematics unit.

7. The method of claim 3, wherein the data indicative of the aspect of the occupant of the vehicle comprises biometric data received from a biometric sensor disposed in the mobile device.

8. The method of claim 1, wherein the severity comprises a numerical value;
  wherein the severity of the vehicular accident is high based on the numerical value being equal to or greater than a pre-determined threshold value; and
  wherein the severity of the vehicular accident is low based on the numerical value being less than the pre-determined threshold value.

9. A non-transitory computer-readable memory having stored thereon executable instructions that when executed by a processor of a mobile device cause the processor to effectuate operations for providing a communication about a vehicular accident, the operations comprising:
  accessing data indicative of a possible vehicular accident involving a vehicle;
  accessing data indicative of an aspect of an occupant of the vehicle;
  determining, based at least on the data indicative of the possible vehicular accident, that a vehicular accident occurred;
  determining a severity of the vehicular accident;
  accessing data identifying a plurality of contacts associated with to the vehicle;
  selecting, based at least on the data indicative of the aspect of the occupant, a first contact and a second contact of the plurality of contacts to notify about the vehicular accident;
  determining, based on the first contact, first content;
  determining, based on the second contact, second content different than the first content;

generating a first communication comprising the first content and a second communication comprising the second content;

when the severity of the vehicular accident is high:
automatically electronically transmitting the first communication to the first contact and the second communication to the second contact; and when the severity of the vehicular accident is low:
prompting a user of the mobile device to confirm communication transmission; and
based on confirmation of the communication transmission, electronically transmitting, by the mobile device, the first communication to the first contact and the second communication to the second contact.

10. The non-transitory computer-readable memory of claim 9, wherein at least one of the first contact or the second contact is selected based at least on the severity of the vehicular accident.

11. The non-transitory computer-readable memory of claim 9, wherein the severity of the vehicular accident is based at least on data indicative of an aspect of the occupant of the vehicle.

12. The non-transitory computer-readable memory of claim 9, wherein the prompting the user to confirm the communication transmission further comprises providing a countdown, wherein an expiration of the countdown comprises the user confirming the communication transmission.

13. The non-transitory computer-readable memory of claim 9, wherein the mobile device comprises a wearable mobile device.

14. The non-transitory computer-readable memory of claim 9, wherein the data indicative of the possible vehicular accident is received from a vehicle telematics unit.

15. The non-transitory computer-readable memory of claim 11, wherein the data indicative of the aspect of the occupant of the vehicle comprises biometric data received from a biometric sensor disposed in the mobile device.

16. The non-transitory computer-readable memory of claim 9, wherein the severity is based on the indicative data.

17. A method for providing a communication about a vehicular accident via a communicatively connected first mobile device and second mobile device, the method comprising:

accessing, by the first mobile device, first data indicative of a possible vehicular accident involving a vehicle;

accessing, by the second mobile device, second data indicative of the possible vehicular accident involving the vehicle;

accessing, by the first mobile device, first data indicative of an aspect of a first occupant of the vehicle;

accessing, by the second mobile device, second data indicative of an aspect of a second occupant of the vehicle;

determining, based at least on the first data indicative of the possible vehicular accident and the second data indicative of the possible vehicular accident, that a vehicular accident occurred;

determining a severity of the vehicular accident;

accessing data identifying a plurality of contacts associated with the vehicle;

selecting, based at least on the first data indicative of the aspect of the first occupant, a first contact of the plurality of contacts to notify about the vehicular accident;

selecting, based at least on the second data indicative of the aspect of the second occupant, a second contact of the plurality of contacts to notify about the vehicular accident, wherein the second contact is different than the first contact;

when the severity of the vehicular accident is high:
automatically electronically transmitting the communication to the first contact and the second contact; and when the severity of the vehicular accident is low:
prompting a user of at least one of the first mobile device or the second mobile device to confirm communication transmission; and
based on confirmation of the communication transmission, electronically transmitting, by the mobile device, the first communication to the first contact and the second communication to the second contact.

18. The method of claim 17, wherein at least one of the first contact or the second contact is selected based at least on the severity of the vehicular accident.

19. The method of claim 17, wherein the transmitting the communication to the at least one of the first contact or the second contact is responsive to the first occupant and the second occupant both confirming the communication transmission.

20. The method of claim 17, wherein the severity is based on a speed of the at least one vehicle during the vehicular accident.

* * * * *